(12) United States Patent
Ganz

(10) Patent No.: US 8,083,031 B2
(45) Date of Patent: Dec. 27, 2011

(54) REMOTELY ACTIVATED MASTHEAD SHEAVE LUBRICATOR APPARATUS AND METHOD

(76) Inventor: Jonathan E. Ganz, Orangevale, CA (US)

(*) Notice: Subject to any disclaimer, the term of this patent is extended or adjusted under 35 U.S.C. 154(b) by 279 days.

(21) Appl. No.: 12/653,255

(22) Filed: Dec. 9, 2009

(65) Prior Publication Data

US 2011/0132689 A1    Jun. 9, 2011

(51) Int. Cl.
*F16N 9/04* (2006.01)
*F16N 13/00* (2006.01)
(52) U.S. Cl. .................. 184/37; 184/38.1; 114/343
(58) Field of Classification Search ............ 184/37, 184/38.1, 100, 38.2–38.4; 92/83; 74/487, 74/488, 489, 501.5, 501.6, 502; 239/337–373
See application file for complete search history.

(56) References Cited

U.S. PATENT DOCUMENTS

| | | | | | |
|---|---|---|---|---|---|
| 4,066,147 | A | * | 1/1978 | Toyomoto | 184/15.1 |
| 4,137,623 | A | * | 2/1979 | Taylor | 29/433 |
| 4,173,363 | A | * | 11/1979 | Stearns | 285/148.23 |
| 4,811,621 | A | * | 3/1989 | Spease | 74/501.5 R |
| 4,856,414 | A | * | 8/1989 | Churkin et al. | 92/83 |
| 4,892,005 | A | * | 1/1990 | Nagano | 74/502.4 |
| 5,142,933 | A | * | 9/1992 | Kelley | 74/502 |
| 5,261,293 | A | * | 11/1993 | Kelley | 74/502.6 |
| 5,535,695 | A | * | 7/1996 | Southwell | 114/221 R |
| 5,868,038 | A | * | 2/1999 | Bravo | 74/502.4 |
| 6,279,683 | B1 | * | 8/2001 | Peachey | 184/105.2 |

* cited by examiner

Primary Examiner — Michael Mansen
Assistant Examiner — Minh Truong

(57) ABSTRACT

The apparatus and method of the present invention provide a crewmember with the ability to lubricate the sheaves at the head of a mast of a contemporary sailing vessel from the deck. A cylinder that may be secured to existing halyards is filled with a lubrication fluid. The cylinder is raised in the usual manner and, once at the top of the mast, a plunger deploys the lubricant through a bifurcated stem to each side of the sheave.

15 Claims, 8 Drawing Sheets

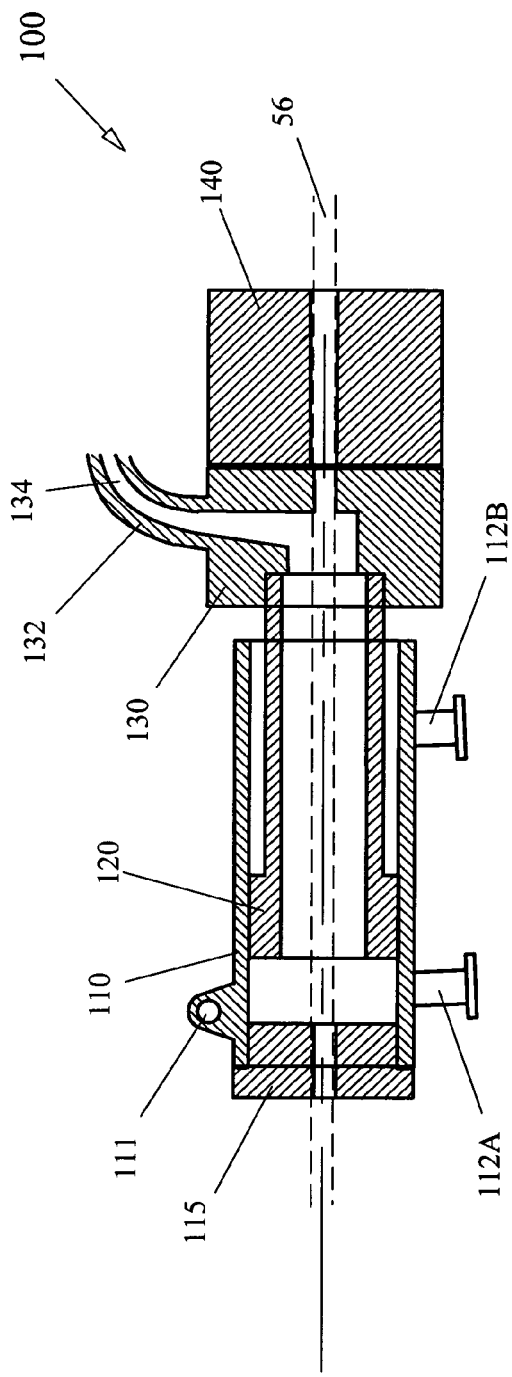
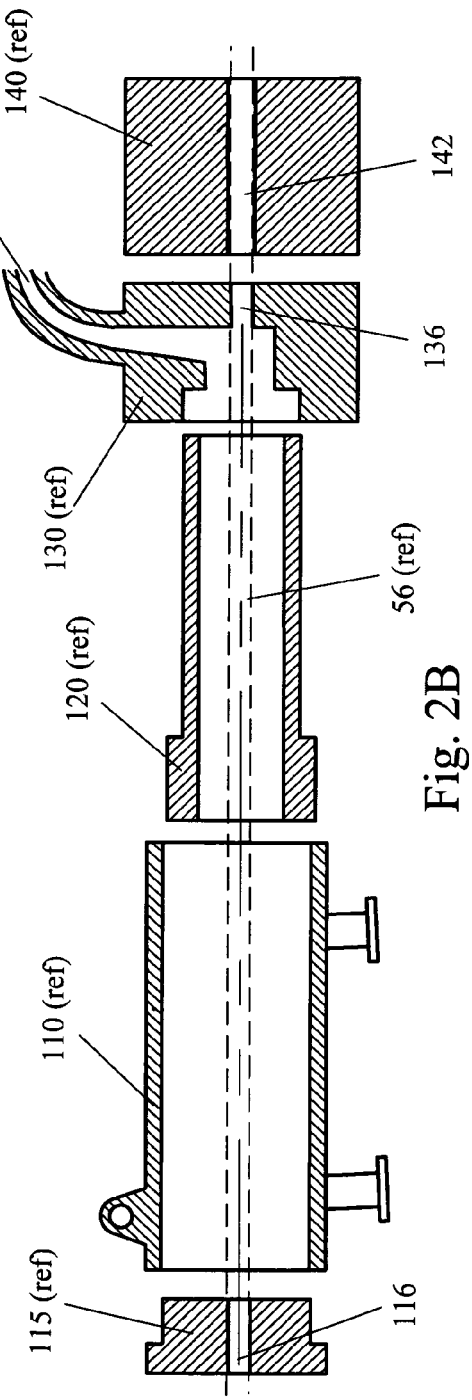
Fig. 2A
Fig. 2B

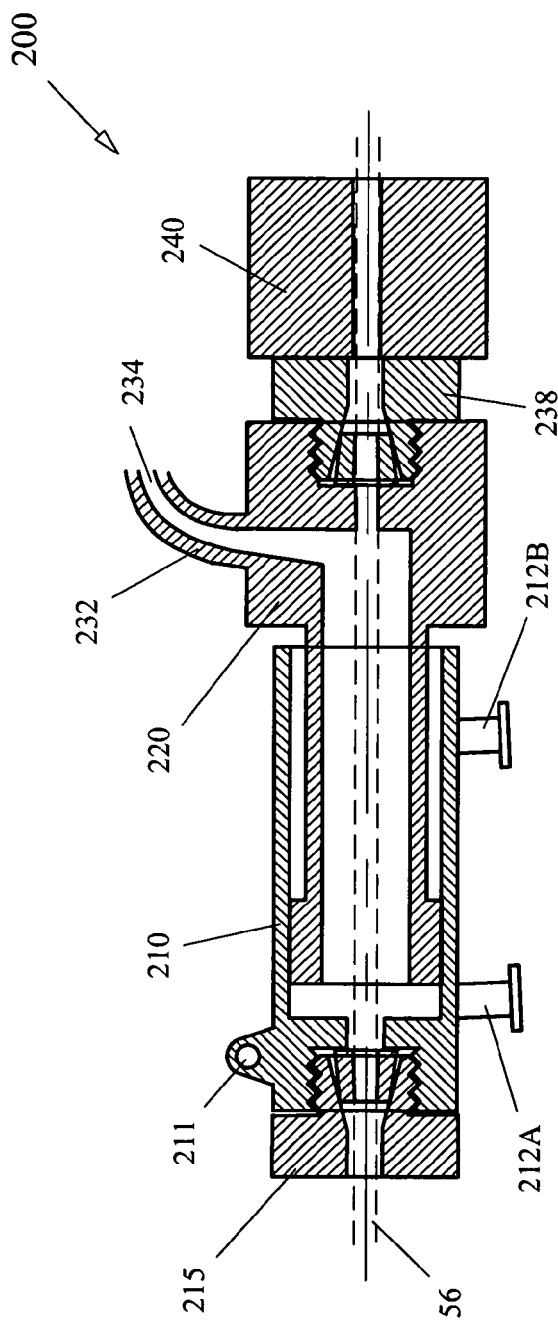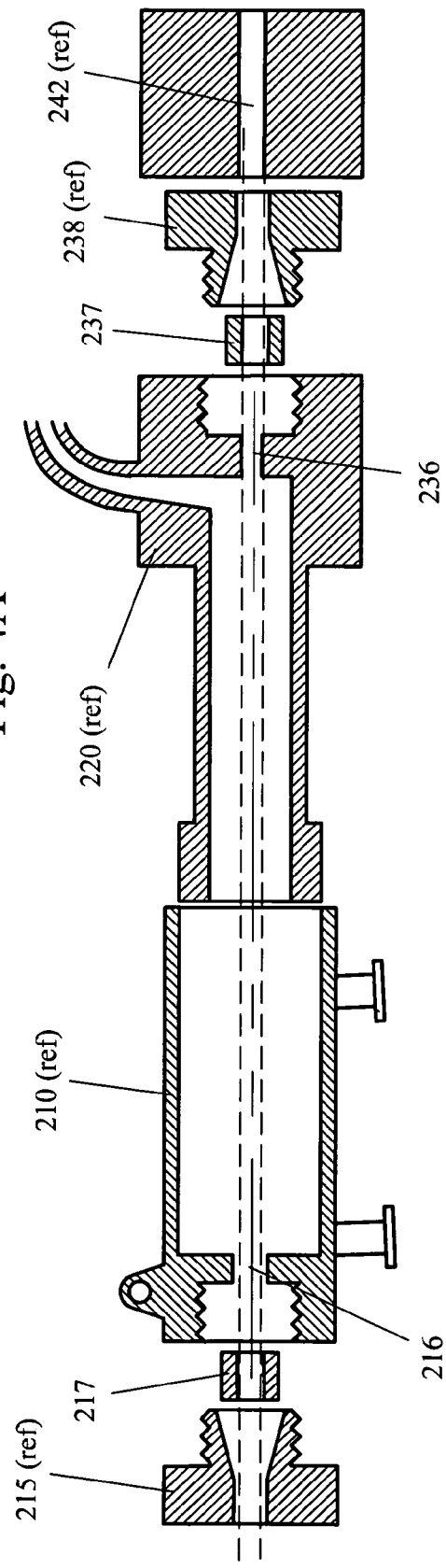
Fig. 4A
Fig. 4B

REMOTELY ACTIVATED MASTHEAD SHEAVE LUBRICATOR APPARATUS AND METHOD

BRIEF DESCRIPTION

The subject of this invention relates to sailing vessels. Specifically, the disclosed invention presents an apparatus and method for use that may be used to lubricate the sheaves present at the head of a mast of a sailing vessel without the need for a crewmember to ascend the mast, thereby eliminating the risk and expense associated with such activity.

BACKGROUND OF THE INVENTION

Sailing vessels have existed for centuries. While modern sailing vessels have taken advantage of the progress made in materials and methods science, the fundamental operation of a sailing vessel remains the same. That is, depending on wind conditions and direction, a sail or sails must be raised, lowered, or trimmed to optimize the performance of the craft.

Modernly, as in historical times, sails are raised and lowered via a system of pulleys or sheaves. For clarity, a pulley is a stand alone device comprised of a housing and a sheave. The sheave is the grooved wheel that a line, or halyard passes across during sail raising/lowering operations. These sheaves are subjected to weather and wear and, as a result, must be lubricated from time to time.

Contemporary sailing vessels use a combination of pulleys and sheaves that have been integrated into the structure of the vessel. For example, at the head of a mast on a modern sailing vessel there will be one or more sheaves permanently affixed to the inside of the mast. Halyards are run from the deck through the interior of the mast to the sheave, and then hence to the working load, for example, a sail. To protect the working sheaves at the head of the mast from weather, a masthead housing of one form or another is used. This housing serves several purposes, including acting as a mount for instrumentation. For purposes of the present invention, it is only noted here that such a housing does exist.

Since the sheave or sheaves at the masthead are mounted inside the mast cavity and are covered by a housing, and since they are so highly integrated with the interior of the mast, they are extremely difficult to lubricate. In fact, at present, the only practical way to accomplish the lubrication process is to ascend the mast and manually deploy the lubricant. This involves a crewmember hoisting themselves aloft or, alternatively, be hoisted aloft by another. This is both a dangerous and time consuming operation.

Even on older or smaller vessels, while the sheave or sheaves may be external to the mast, they are still very difficult to get to, thus the lubrication task remains very difficult. For example, on most vessels the spinnaker sheave will be external and will require lubrication from time to time.

If a crewmember wishes to hoist themselves aloft, products such as the TopClimber from ATN, Inc., Hollywood, Fla., may be used. This device allows a crewmember to place each foot in a loop and, using upper body strength and alternate foot movement, slowly pull themselves to the head of the mast. Alternatively, a classic "bosun's chair" may be used. For this method, the crewmember sits in a seat and is pulled aloft by one or more other crewmembers.

Each of the above methods has its drawbacks. For both, one or more crewmembers are put at risk of injury due to falling, tangling or other physical failure modes. Beyond the danger, because all present methods use the existing halyard system, the crewmember can have trouble reaching the actual masthead to accomplish the lubrication.

What would be desirable would be an apparatus and method that would allow a single crewmember to accomplish the masthead sheave lubrication task from the safety of the deck.

SUMMARY OF THE INVENTION

The apparatus and method of the present invention provide a crewmember with the ability to lubricate the sheaves at the head of a mast of a contemporary sailing vessel from the deck. A cylinder that may be secured to existing halyards is filled with a lubrication fluid. The cylinder is raised in the usual manner and, once at the top of the mast, a plunger deploys the lubricant through a bifurcated stem to each side of the sheave.

The apparatus of the present invention is generally comprised of four parts: a cylinder that is fillable with a lubricating fluid, a plunger deployed on the inside diameter of the cylinder, a manifold that receives lubricating fluid from the cylinder, and a bifurcated stem for directing the lubricating fluid to the sides of the sheave at the masthead. Also present is a foam bumper used to protect the masthead housing from the apparatus when in use. Each of these parts is capable of being fastened about an existing halyard. The various parts have been dimensioned to allow use with a range of halyard diameters.

In use, a crewmember attaches the cylinder about the halyard just above the existing sail cringle shackle, fills the cylinder with the appropriate type and amount of lubricant, inserts the plunger a small distance inside the cylinder, and places the manifold and bumper on the halyard. The assembled device is then hauled aloft until the bumper contacts the masthead housing. As the crewmember continues to haul on the halyard, the plunger is forced into the cylinder causing the fluid to be forced into the manifold and out the bifurcated stem.

The present invention as disclosed has two embodiments. Each of these embodiments is dimensioned and constructed to allow use over a broad range of halyard sizes, thus may be used on the vast majority of modern day sailing vessels. Each of the embodiments of the present invention is discussed in detail in conjunction with the drawings listed below. As will be evident, the apparatus and method of the present invention overcomes the disadvantages of the prior art.

BRIEF DESCRIPTION OF THE DRAWINGS

FIGS. 2A & 2B: are sectional views of a first embodiment of the present invention.

FIGS. 4A & 4B: are sectional views of a second preferred embodiment of the present invention.

DETAILED DESCRIPTION OF PREFERRED EMBODIMENTS

Figure 1:
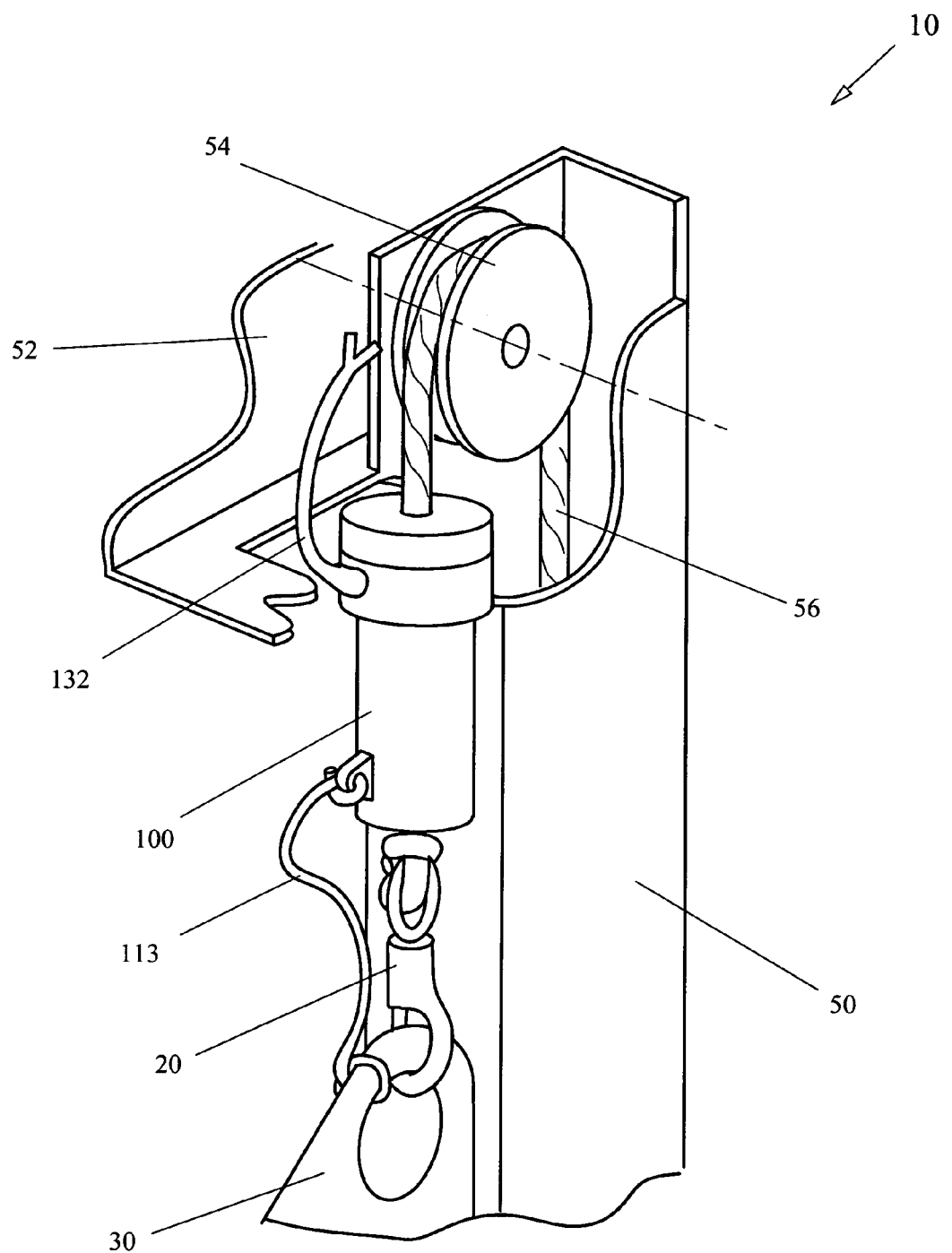
FIG. 1: is an isometric view of the apparatus of the present invention at the masthead.

As described briefly above, the method and apparatus of the present invention solves the problems associated with prior art masthead sheave lubrication methods. FIG. 1 provides an overview 10 of the apparatus and associated method of the present invention. A contemporary sailing vessel mast 50 is generally a hollow tube. Running inside mast 50 are one or more halyards 56 used to operate the sails of the vessel. Each of the halyards 56 must be routed over a sheave 54 in order to prevent binding. Since the sheaves 54 are exposed to the elements, they require lubrication from time to time, and while the mast 50 has a masthead housing 52, it is not sufficient to prevent spray from entering the mast cavity.

As will be described in detail below, the apparatus of the present invention is comprised of a number of parts, but generally, a cylindrical chamber 100 is placed around halyard 56 just above the clip 20. It will be recognized that while a clip is shown in the figure, a shackle or any other method used to attach the halyard to the sail cringle 30 may be used without departing from the spirit of the invention. A safety lanyard 113 of sufficient strength so that it will not break under, normal load is attached to the base of the cylindrical chamber 100 and also to the sail cringle 30. This is done to ensure that the cylindrical chamber 100 can be lowered once the lubrication task has been completed. Alternatively, if the present invention is being used without the sail, a downhaul line may be attached to the sail clip 20 and the safety lanyard 113 then tied to the downhaul line.

A suitable lubricant is placed inside cylindrical chamber 100 and, as detailed below, the assembled device is hauled aloft until contact is made with the masthead housing 52. At that point a plunger is driven into the cylindrical chamber 100 forcing the lubricant inside to be dispersed through a bifurcated stem 132 which is integrated into a manifold. Each fork of the bifurcated stem 132 is aimed generally at one side of the sheave 54. A sufficient amount of lubricant is dispersed such that accuracy is not paramount.

Looking now at FIG. 2A, a sectional view of a first embodiment of the present invention 100 is shown. A cylindrical chamber 110 has a tab 111 suitable for fastening a safety lanyard. Sail track cars 112A and 112B are used to assist in guiding the device to the masthead. It will be noted that the use of the sail track cars 112A and 112B are not required for proper operation, but are included as an aid to the user. A base stopper 115 is inserted at one end of the cylindrical chamber 110. The combination of the cylindrical chamber 110 and the base stopper 115 creates a cavity for containing a suitable lubricant.

A first end of a plunger 120 is sized so as to fit snugly inside the inner diameter of the cylindrical chamber 110. A second end of the plunger 120 is sized so as to fit the inside diameter of dispersal manifold 130. The dispersal manifold is further configured to have a bifurcated stem 132 through which a channel 134 allows passage of a suitable lubricant. Note that while the entire length of the bifurcated stem 132 is not shown, those skilled in the art will recognize that this need not be shown to completely and accurately describe the present invention. A rubber bumper 140 is also placed about the halyard 56 such that it lies between the dispersal manifold 130 and the masthead housing (52 of FIG. 1). In the preferred embodiments of the present invention the bumper 140 is made of rubber, but it could just as easily be made of plastic or any other material that would not damage the mast housing, thus use of a substitute material still falls within the ambit of the claims.

FIG. 2B provides an exploded sectional view of a first embodiment of the present invention 100. Of importance in this figure are through-holes 116, 136 and 142. Through-hole 116 in base stopper 115 is sized to provide an interference fit around halyard 56 in order to prevent leakage of lubricant from the cylindrical chamber 110. The interference fit of through-hole 116 also provides a physical clamping action allowing the present invention 100 to be hauled up and down. As described in detail below, base stopper 115 has several versions each with a different through-hole size to match several different halyard diameters.

Through-hole 136 at the end of the manifold 130 opposite the plunger 120 is a slip fit, so is not as restrictive as through-hole 116. This is so because through-hole 136 must permit the halyard 56 to slide when the plunger 120 is being driven into the cylindrical chamber 110. Thus through-hole 136 is sized to allow some movement but not permit the escape of lubricating fluid. Since the path of least resistance for the lubricating fluid is the channel 134 of the dispersal stem 132, through-hole 136 need only offer a higher resistance to the flow of fluid. Through-hole 142 is a loose fit and serves only to ensure that rubber bumper 140 stays positioned correctly about halyard 56.

Figure 3A:
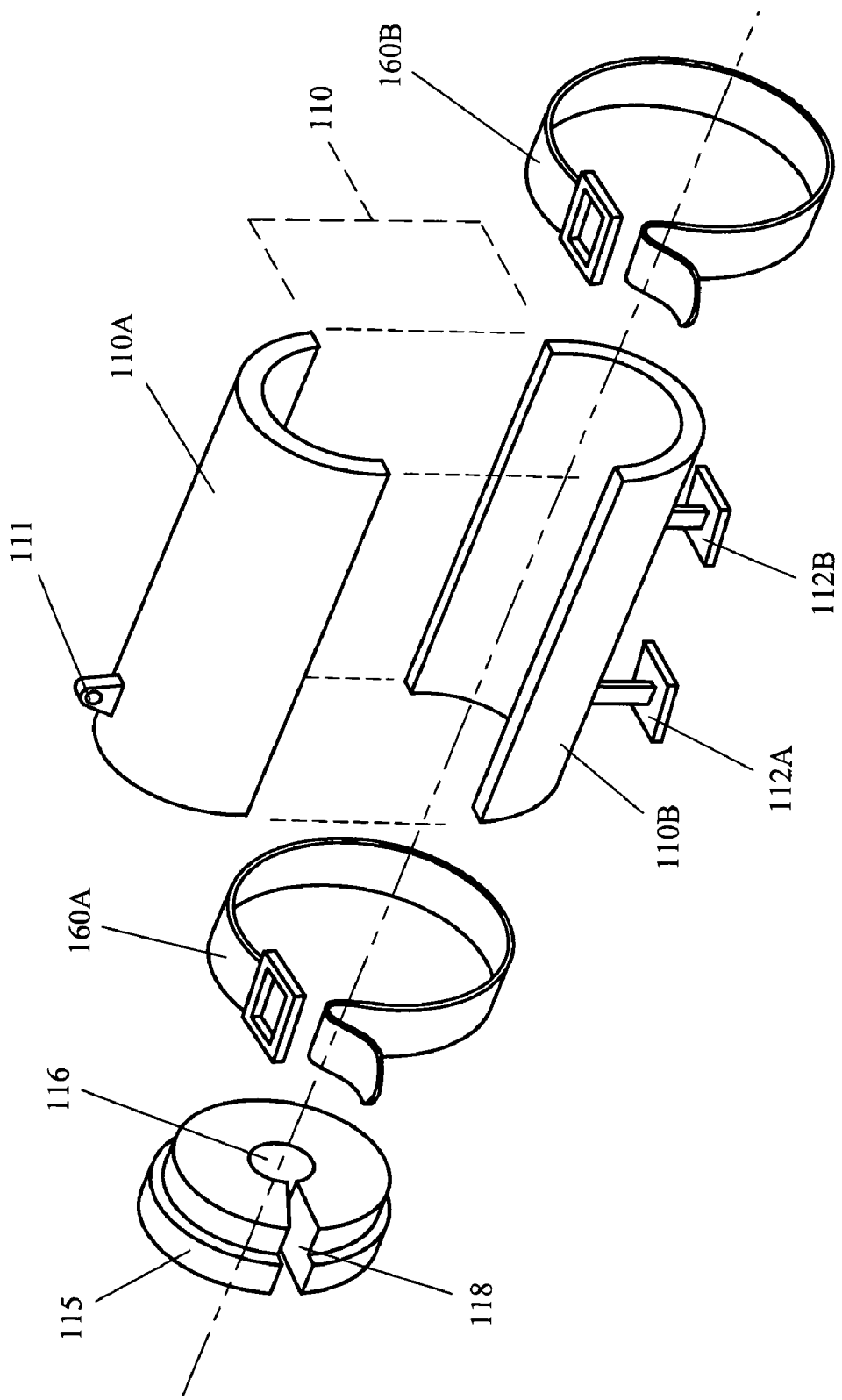
FIGS. 3A & 3B: are detailed isometric views of the parts of a first embodiment of the present invention.

Referring now to FIG. 3, an exploded isometric view of a first embodiment of the present invention is shown. As can be seen, the cylindrical chamber 110 is comprised of two halves, top half 110A and bottom half 110B. This is so because the cylindrical chamber 110 must be capable of being placed about a halyard. Top half 110A has tab 111 for use in attaching a safety, lanyard (not shown). As described below, this safety lanyard is used to ensure that the device can be hauled down after the lubricating task has been completed. Bottom half 110B has two sail track cars 112A and 112B that are used to assist the raising and lowering of the present invention. While not necessary, they provide positional stability and thus more accurately locate the bifurcated tip [132 of FIG. 6].

Straps 160A and 160B are used to clamp the two halves of the cylindrical chamber 110 together. In this embodiment, the straps are of the hook-and-loop type [for example Velcro from Velcro Industries B.V., Manchester, N.H.] but as will be recognized by those of skill in the art, other clamping means may be used to clamp the halves together without exceeding the scope of the claims presented. In this first embodiment of the present invention, top half 110A and bottom half 110B are formed from plastic, but it will be understood that other materials could be used without departing from the spirit of the invention, for example, aluminum.

Base stopper 115 is sized such that when straps 160A and 160B are engaged, a seal is formed on the inside diameter of cylindrical chamber 110. At the same time, the gap 118 of base stopper 115 is compressed closed. As discussed above in conjunction with FIG. 2, through-hole 116 forms an interference fit around a halyard. In combination, base stopper 115, gap 118 and through-hole 116 are sized such that a lubricating fluid may be placed inside the cylindrical chamber 110 without leakage. While the inside diameter of the cylindrical chamber 110 remains constant, the through-hole 116 varies to permit using the present invention with a plurality of standard halyard sizes. By way of example, but not meant as a limitation, through-hole 116 can be any of 3/8 inch, 5/16 inch, 7/16 inch, 8 millimeter, 10 millimeter or 12 millimeter.

Figure 3B:
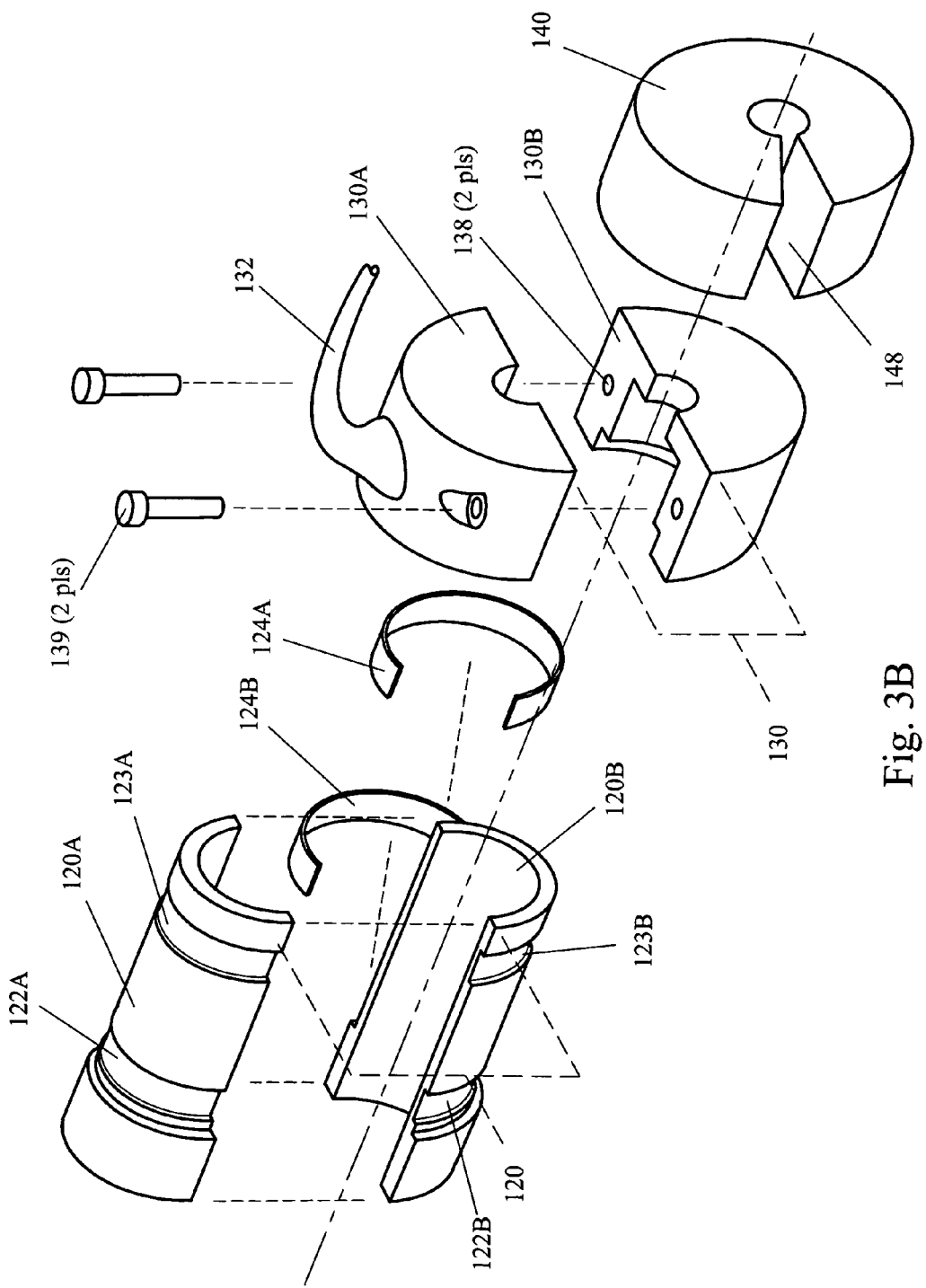

FIG. 3B provides an exploded isometric view of the remainder of the parts of a first embodiment of the present invention. The plunger 120 of FIG. 2A is comprised of a top half 120A and a bottom half 120B. Spring clamps 124A and 124B fit into slots 122A, 122B, 123A and 123B respectively. Spring clamps 124A and 124B and slots 122A, 122B, 123A and 123B are sized such that the two halves of plunger 120 are properly located and held in place. In a first embodiment of the present invention the spring clamps are made from beryllium copper, but it will be understood that other materials could be used without departing from the spirit of the invention.

Dispersal manifold 130 of FIG. 2A is comprised of top half 130A and bottom half 130B. The two halves are mated by screws 139 and locating holes 138. The combination of the screws 139 and locating holes 138 ensure that the dispersal manifold 130 is able to properly receive the end of plunger 120. Stem 132 is an integral part of dispersal manifold 130. The top half 130A and bottom half 130B of the dispersal manifold 130 are formed from plastic, but it will be understood that other materials could be used without departing from the spirit of the invention, for example, aluminum. Rubber bumper 140 is formed of rubber in a first embodiment of the present invention, however it will be understood that other materials could be used without departing from the spirit of the invention. By way of example, but not meant as a limitation, the rubber bumper could be made from foam plastic. Gap 148 of rubber bumper 140 is sized to allow the bumper to be placed about a halyard.

A sectional view of a second preferred embodiment 200 is shown in FIG. 4. Looking first at FIG. 4A, again the present invention consists generally of a cylindrical chamber 210, a base stopper 215, a plunger and manifold combination 220 and a rubber bumper 240. Each of these main components fits about a halyard 56 using a clamshell type construction as was the case with the first embodiment described above. Tab 211 and the sail track cars 212A and 212B are identical to and perform the same functions as the corresponding items in the first embodiment.

The primary difference between the two embodiments is that in the second preferred embodiment the plunger and dispersal manifold have been integrated into one piece for ease of manufacture. Thus the plunger walls are formed as an integral part of the dispersal manifold. The stem 232 and the channel 234 are identical to and perform the same functions as the corresponding items in the first embodiment. Manifold stopper 238 is threaded in order to mate with a complimentary thread in the end of the plunger/dispersal manifold combination 220.

Also different in the second preferred embodiment, base stopper 215 is threaded in order to mate with a complimentary thread in the end of the cylindrical chamber 210. As described in detail below, both base stopper 215 and manifold stopper 238 have tapered interior spaces used to compress a fitting, or collar, about the halyard 56.

FIG. 4B provides an exploded sectional view of a second preferred embodiment of the present invention 200. Of importance in this figure are through-holes 216, 236 and 242. Unlike the first embodiment described above, through-holes 216 and 236 are sized to fit around the largest halyard 56 for which the present invention is intended to be used. Thus in order to prevent leakage of lubricant from the cylindrical chamber 210 or the plunger/manifold combination 220, a compressible collar 217 or 237 respectively is used. The halyard passage hole in both base stopper 215 and manifold stopper 238 have a tapered portion. The purpose of this tapered portion is to compress compressible collars 217 or 237 to form the requisite seal about a halyard. Additionally, the compression force provides the traction to prevent the invention from slipping on the halyard during raising and lowering operations.

The interference fit needed for each of the through-holes 216 and 237 is provided by sizing the compressible collars 217 and 237 properly. However, the function of the through-holes is the same as for the similarly labeled items in the first embodiment of the present invention, thus are not discussed in detail here. However, it will be noted that the same plurality of halyard sizes can be used with the second preferred embodiment as with the first embodiment discussed above.

Through-hole 242 is a loose fit and serves only to ensure that rubber bumper 240 stays positioned correctly about halyard 56.

Figure 5A:
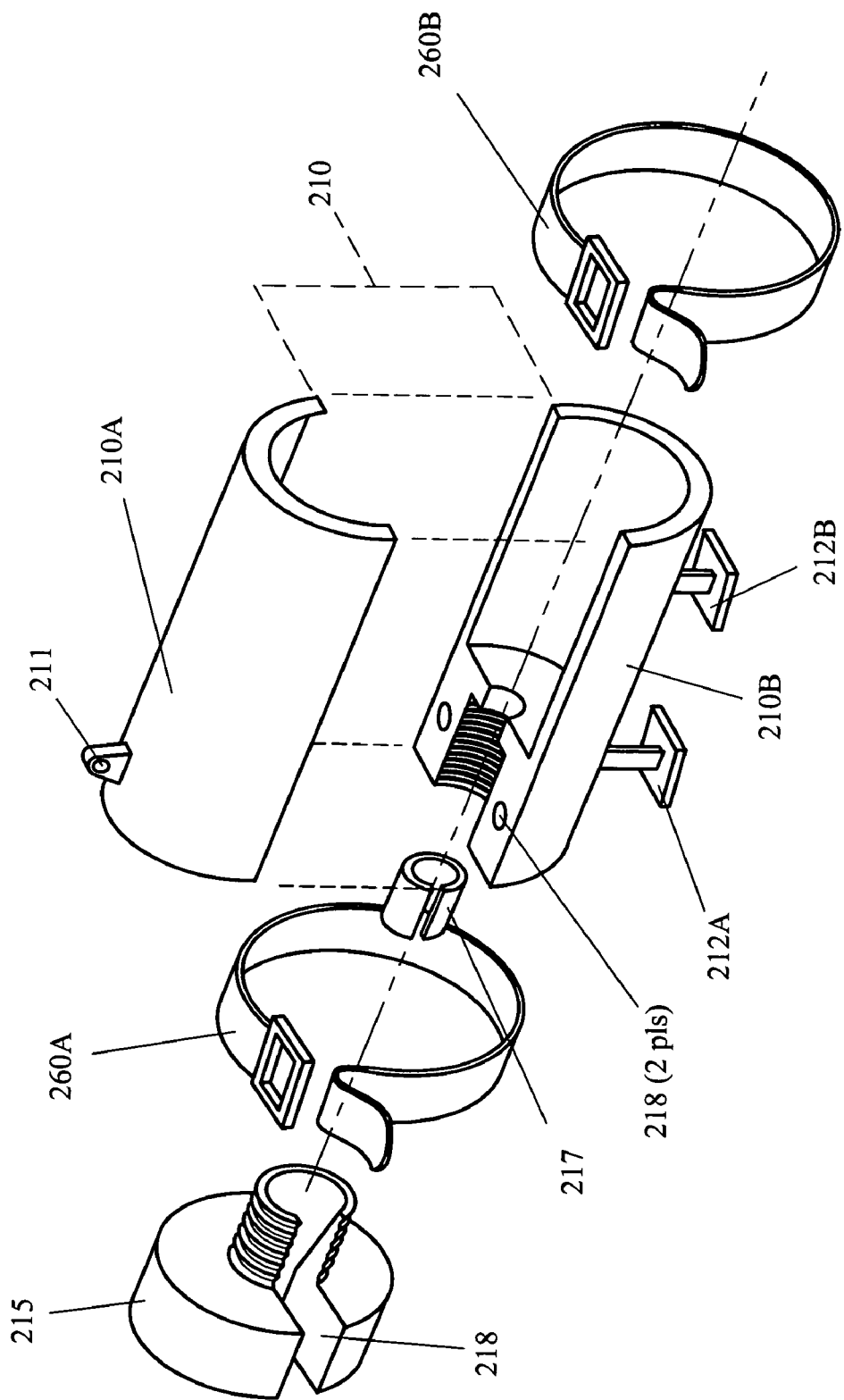
FIGS. 5A & 5B: are detailed isometric views of the parts of a second preferred embodiment of the present invention.

Referring now to FIG. 5, an exploded isometric view of a second preferred embodiment of the present invention is shown. As can be seen, the cylindrical chamber 210 is comprised of two halves, top half 210A and bottom half 210B. This is so because the cylindrical chamber 210 must be capable of being placed about a halyard. Top half 210A has tab 211 for use in attaching a safety lanyard (not shown). As described below, this safety lanyard is used to ensure that the device can be hauled down after the lubricating task has been completed.

Bottom half 210B has sail track cars 212A and 212B that perform the same function as described above, thus are not discussed in detail here. Straps 260A and 260B are used to clamp the two halves of the cylindrical chamber 210 together. Locating holes 218 are used to ensure that the two halves are properly aligned. Not shown, but well understood by those of skill in the art, are two complimentary locating pins situated in the top half of cylindrical chamber 210A opposite each of the locating holes 218.

In this second preferred embodiment, as with the first embodiment presented above, the straps are of the hook-and-loop type but as will be recognized by those of skill in the art, other clamping means may be used to clamp the halves together without exceeding the scope of the claims presented. For example, the straps could be of the hose clamp type. In this second preferred embodiment of the present invention, top half 210A and bottom half 210B are formed from plastic, but it will be understood that other materials could be used without departing from the spirit of the invention, for example, aluminum.

Base stopper 215 is constructed such that when straps 260A and 260B are engaged, the threads on the end of base stopper 215 engage precisely with the receiving threads in the end of the cylindrical chamber 210. Unlike the base stopper of the first embodiment, the gap 218 of base stopper 215 is sized such that the largest halyard with which the present invention will be used can be slipped through to the center. The inner space of base stopper 215 is tapered such that when the stopper is threaded into the cylindrical chamber 210 compressible collar 217 forms an interference fit about the halyard. In doing so the proper seal to prevent leakage is formed.

Figure 5B:
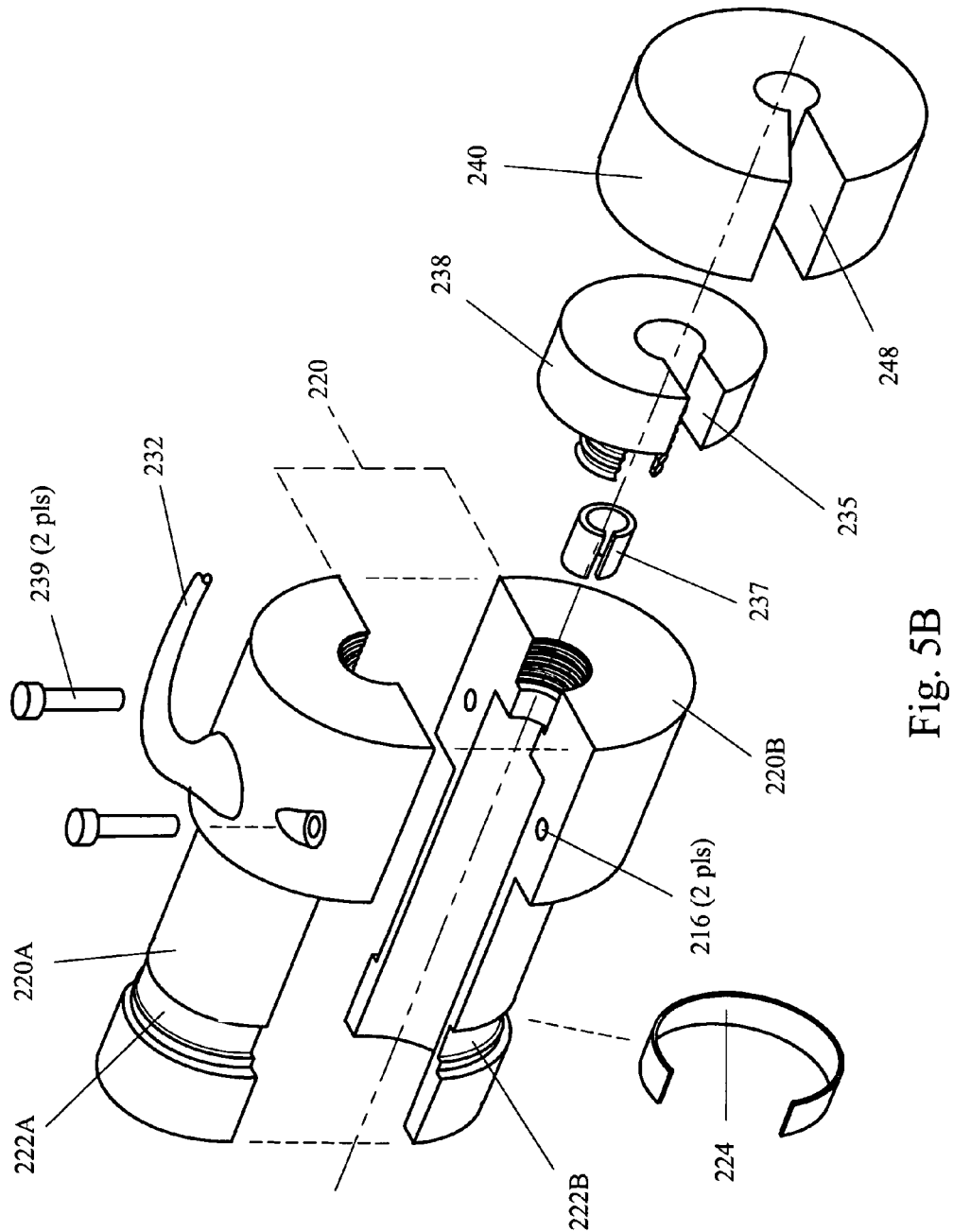

Turning to FIG. 5B, an exploded isometric view of the remainder of the parts of a second preferred embodiment of the present invention is shown. The plunger/manifold combination 220 have been formed into a single piece with a top half 220A and a bottom half 220B. A single spring clamp 224 fits into slots 222A and 222B. Spring clamp 224 and slots 222A and 222B are sized such that the two halves of plunger/manifold combination 220 are properly located and held in place. Locating holes 216 are also used to ensure that the two halves are properly aligned. Not shown, but recognized by those of skill in the art, a pair of matching locating pins extend downward from the bottom surface of top half 220A. Screws 239 thread into locating holes 216 to provide physical stability and to further ensure proper alignment. In this second preferred embodiment of the present invention the spring clamp is made from beryllium copper, but it will be understood that other materials could be used without departing from the spirit of the invention.

The dispersal manifold of the second preferred embodiment is part of the plunger/manifold combination 220. Stem 232 is an integral part of plunger/manifold combination 220 and performs the same function as the similarly labeled item in the first embodiment of the present invention. In this second embodiment the top half 220A and bottom half 220B of the plunger/manifold 220 are formed from plastic, but it will be understood that other materials could be used without departing from the spirit of the invention.

Manifold stopper 238 and compressible collar 237 are formed in the same manner and accomplish the same function as the base stopper 215 and compressible collar 217, however, rather than an interference fit, compressible collar 237 provides only a slip fit when the manifold stopper 238 is threaded into position. This is because the halyard (56 of FIG. 4) must be allowed to move during the depression of the plunger to disperse the lubricating fluid contained in the cylindrical chamber 210. Since this is so, the compressible collar 237 has several instantiations, one for each of the standard halyard sizes as described above. Gap 235 is sized to permit the largest halyard to slip into manifold stopper 238.

Rubber bumper 240 is formed of rubber in a second preferred embodiment of the present invention, however it will be understood that other materials could be used without departing from the spirit of the invention. By way of example, but not meant as a limitation, the rubber bumper could be made from foam plastic. Gap 248 of rubber bumper 240 is sized to permit the largest halyard to be used to slip into the center of the bumper.

Of course other embodiments are possible without departing from the spirit of the invention. For example, it would be possible to place an aerosol can inside the cylinder that is activated by the same plunger mechanism as describe above. While possible, the use of aerosol accelerants is deleterious to the environment, thus no embodiment of such an implementation is shown here; however, that does not mean that it would not function as described for the embodiments above.

Figure 6:
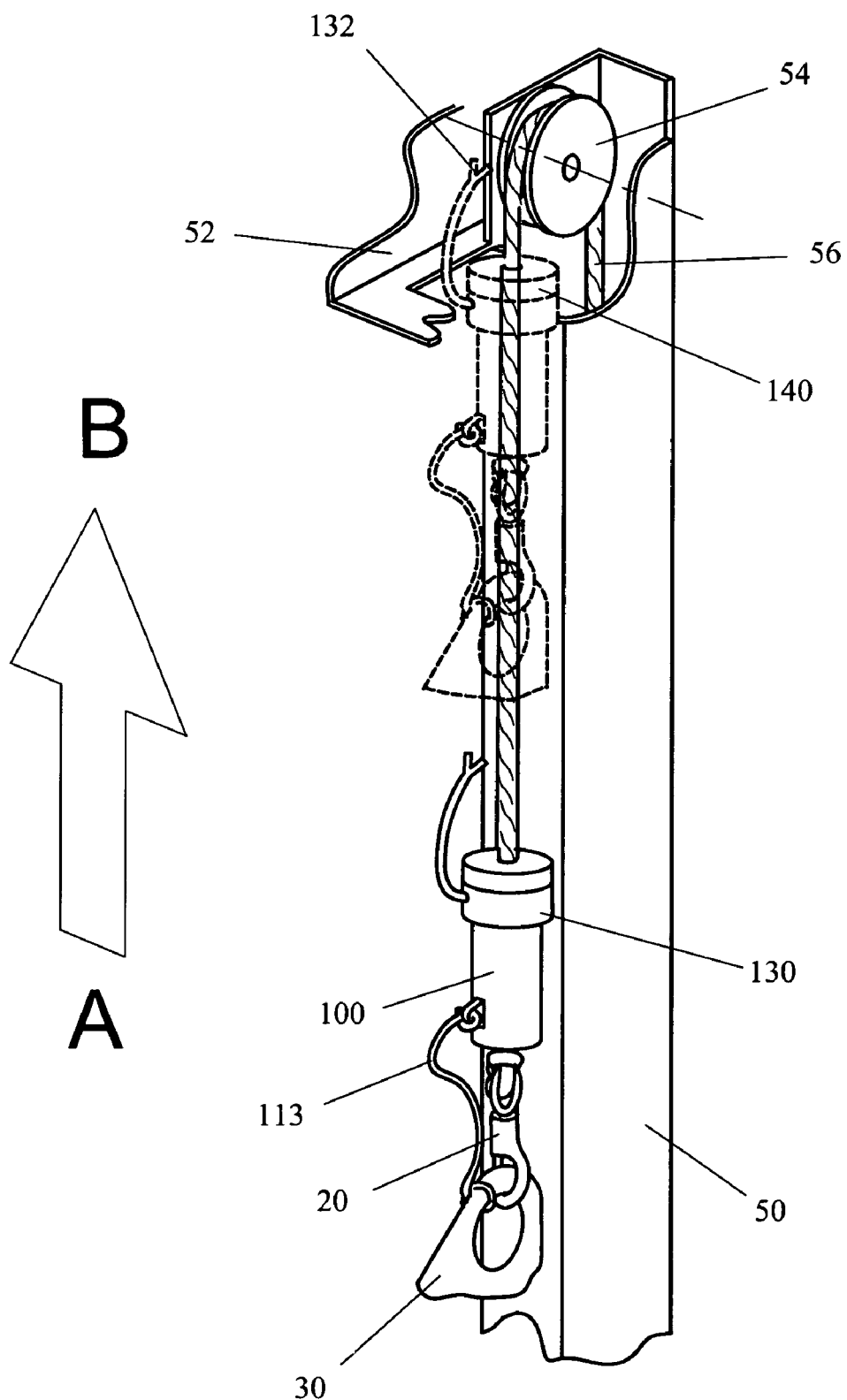
FIG. 6: is an isometric view showing the method of operation of either embodiment of the present invention.

FIG. 6 provides an illustration of the method of use of the present invention. Both the first and the second preferred embodiments of the present invention work in the same way.

Recall that a sailing vessel has a hollow mast 50 topped by a masthead housing 52 and has one or more sheaves 54 capable of raising and lowering sails with a halyard 56. A user places the cylindrical chamber, for example 110 of FIG. 2 or 210 of FIG. 4, around the halyard, assembles the base stopper and straps such that it can be filled with a suitable lubricating fluid such as SailKote, from McLube Division of McGee Industries, Inc., Aston, Pa. The plunger, in the case of the first embodiment, or the plunger/manifold in the case of the second preferred embodiment is located about the halyard and assembled as required. Last the rubber bumper is placed about the halyard.

Note that while the majority of modern day sailing vessels make use of a hollow mast, older vessels have a solid mast, with the sheaves located external to the mast. An advantage of the present invention is that it may be used just as easily with older, solid style masts as well as the more modern hollow mast. Thus the fact that the discussion of the present invention centers on modern, hollow masts should not be read as a limitation on the scope of the invention.

The cylindrical chamber is placed just above the clip 20 that attaches the halyard 56 to the sail cringle 30. This is because it is the force of the clip on the base stopper that lifts the device aloft as the halyard is hauled. Note also that if the lubricating task is being accomplished on the main sail, the sail cars located on the bottom of the cylindrical chamber will be fitted inside the mainsail track on the mast. Finally, note that the present invention can be used in a stand-alone manner. That is, the device may be placed about the halyard without the sail attached, and a downhaul line attached to downhaul the device after the lubricant has been dispersed.

For the balance of the discussion, the device 100 will be considered to be either of the first embodiment or the second preferred embodiment. Once the device 100 has been completely assembled and loaded, the lanyard 113 is fastened to the sail cringle 30. This is done to ensure that once the lubricating fluid has been dispersed, the device 100 will be downhauled with the sail. At this point the device 100 is ready for deployment and is at position A in FIG. 6. Note that while in the figure position A is shown in close proximity to the masthead, it is in reality at the deck level. The figure is done in this way for clarity.

The user simply hauls the sail aloft by pulling on the halyard 56. This action moves the device 100 from position A to position B. Once at position B the user will feel resistance to further pulling. At this time the rubber bumper 140 has contacted the masthead housing 52 causing the plunger to be driven into the cylindrical chamber forcing the lubricating fluid into manifold 130 and through stem 132. Recall that the end of the stem 132 is bifurcated. This causes lubricating fluid to be dispersed to both sides of the sheave 54. While there may be lubricating fluid deposited on other surfaces, including the halyard, this is not detrimental, thus is of no concern.

Once the user has completed the dispersal of the lubricant the invention may be downhauled if working in the stand-alone maintenance manner, or can be hauled down when the sail is lowered at the completion of the day's sailing activity. Leaving the invention deployed at the masthead while the vessel is under way does not hinder sail operation or damage the invention. Alternatively, with a minor sail height adjustment, the present invention may be left in situ indefinitely since it does not interfere with normal sailing operations. Having this ability allows the user to accomplish the lubrication task on a more regular basis since the device is already present.

One advantage of the present invention is that it provides a user with a simple, easy to use method for lubricating the sheaves at the head of a sailing vessel mast without the need for a crewmember to go aloft. This single-handed operation is a substantial improvement over contemporary methods of masthead sheave lubrication.

A second advantage of the present invention is a significant improvement in safety. Contemporary methods require a crew member to go aloft, either in a bosun's chair or using a single person harness of one sort or another. Either of the methods increases the likelihood that a person will be injured from a fall or from being tossed against the mast as a result of the vessel rocking. Further, the person going aloft must carry the lubricant and tools with them, increasing the chance that one or more of these may be dropped, doing damage to the vessel or a crew member on deck.

A third advantage of the present invention is that it may be used simultaneously with normal sailing operations. Thus the invention may be deployed just prior to raising the sails, run aloft, the lubricant dispersed, and then remain there during normal sailing operations. The fact that no damage occurs to the invention and that the invention does not interfere with normal sailing operations is a significant time savings.

A fourth advantage of the present invention is that it may be installed and left indefinitely. This is possible since the device does not interfere with normal sailing operations. Having the device assembled and ready for use encourages a user to accomplish the lubrication task on a more regular basis, thereby extending the useful life of the sheaves and increasing the time-to-failure of these remotely located moving parts.

A fifth advantage of the present invention is that it may be used with older, solid style masts as well as with the more modern hollow mast. This makes the present invention suitable for a far broader range of applications than if only hollow masts were addressed.

What is claimed is:

1. An apparatus for lubricating the sheaves at the head of a mast of a sailing vessel, comprising:
   a first cylinder, said first cylinder further comprised of
      a first top half, said first top half having disposed on its outer surface a tab suitable for attaching a lanyard;
      a first bottom half, said first bottom half having disposed on its outer surface directly opposite said tab a pair of sail track cars;
      a base stopper, said base stopper having a hole through its center and a gap from the outer surface of said base stopper to said hole in said center of said base stopper suitable for passing a halyard into said hole;
      a pair of straps disposed so as to mate said first top half of said first cylinder to said first bottom half of said first cylinder, said base stopper located at a first end of the mated said first top half and said first bottom half of said first cylinder, the outer diameter of said base stopper mating with the inner diameter of said assembled first top half and said first bottom half of said first cylinder, said straps then tightened about said assembled first top half and said first bottom half of said first cylinder causing said gap in said base stopper to compress about said halyard in said hole of said base stopper forming a lubricant chamber suitable for containing lubricant;
   a second cylinder, said second cylinder further comprised of
      a second top half, said second top half having a pair of slotted depressions in its outer surface;
      a second bottom half, said second bottom half having a pair of slotted depressions in its outer surface;
      a pair of clamping springs such that said second top half is mated with said second bottom half by fitting said clamping springs in said slots forming a piston with an outer diameter fitting inside the inner diameter of said assembled first cylinder;
   a manifold, said manifold further comprised of a top piece having an inner and outer surface and a bottom piece having an inner and outer surface;
      said top piece of said manifold further comprised of;
         a bifurcated stem disposed on its outer surface, said bifurcated stem and said top piece having a passage extending from the inner surface of said top piece to an opening at the end of said bifurcated stem;
         a pair of clearance holes on the outer surface suitable for accepting a pair of clamping bolts;
         a semicircular through hole along the center axis of said manifold;
      said bottom piece having two threaded holes suitable for accepting a pair of clamping bolts and a semicircular through hole along the center axis of said manifold such that said top piece and said bottom piece are mated and held together by said clamping bolts forming said manifold, said semicircular through holes forming a loose fit about a halyard while at the same time clamping said manifold to the outer surface of said piston, and;
   a rubber bumper, said rubber bumper having a hole through its center and a gap from the outer surface of said rubber bumper to said hole in said center of said rubber bumper suitable for passing a halyard into said hole such that when said rubber bumper is driven into said manifold, said piston is driven into said lubricant chamber of said first cylinder thereby forcing said lubricant through said bifurcated stem.

2. The apparatus of claim 1 wherein the base stopper, the manifold and the rubber bumper are each sized to pass a halyard of any of 5/16 inch, 3/8 inch or 7/16 inch.

3. The apparatus of claim 1 wherein the base stopper, the manifold and the rubber bumper are each sized to pass a halyard of any of 8 millimeter, 10 millimeter or 12 millimeter.

4. The apparatus of claim 1 wherein the pair of straps are hook-and-loop straps.

5. The apparatus of claim 1 wherein the pair of straps are hose clamp straps.

6. The apparatus of claim 1 wherein the first cylinder first top half and first bottom half, the second cylinder second top half and second bottom half and the manifold top piece and bottom piece are made of plastic.

7. An apparatus for lubricating the sheaves at the head of a mast of a sailing vessel, comprising:
   a first cylinder, said first cylinder further comprised of
      a first top half, said first top half having disposed on its outer surface a tab suitable for attaching a lanyard and a female threaded portion at a first end;
      a first bottom half, said first bottom half having disposed on its outer surface directly opposite said tab a pair of sail track cars and a female threaded portion at a first end;
      a base stopper, said base stopper further comprised of;
         a hole through its center and a gap from the outer surface of said base stopper to said hole in said center of said base stopper suitable for passing a halyard into said hole;
         a first compressible collar, said first compressible collar suitable to be disposed about a halyard;
         a male threaded portion, said male threaded portion having a tapered inner wall, said threads of said male threaded portion suitable for mating with said female threaded portion of said first top half and said first bottom half of said first cylinder;
      a pair of straps disposed so as to mate said first top half of said first cylinder to said first bottom half of said first cylinder, said straps then tightened about said assembled first top half and said first bottom half of said first cylinder, said male threaded portion of said base stopper threaded into said assembled first cylinder such that said first compressible collar is compressed about a halyard by said tapered inner wall of said base stopper, causing said first compressible collar to form a seal about said halyard thereby forming a lubricant chamber suitable for containing lubricant;
   a plunger/manifold, said plunger/manifold further comprised of;
      a second top half having an inner and outer surface, said second top half further comprised of;
         a slotted depression in its outer surface near a first end and a pair of clearance holes on the outer surface suitable for accepting a pair of clamping bolts at the end opposite said first end;
         a bifurcated stem disposed on its outer surface, said bifurcated stem and said second top half having a passage extending from the inner surface of said second top half to an opening at the end of said bifurcated stem;
         a female threaded portion at the end opposite said first end;
      a second bottom half having an inner and outer surface, said second bottom half further comprised of;

a slotted depression in its outer surface near a first end;
a pair of threaded holes suitable for accepting a pair of clamping bolts at the end opposite said first end;
a female threaded portion at the end opposite said first end;
a clamping spring such that said second top half is mated with said second bottom half by fitting said clamping spring in said slot at said first end of said second top half and second bottom half and clamping bolts threaded into said pair of clearance holes in said second top half and said pair of threaded holes in said second bottom half thereby forming a piston portion on said first end and a manifold portion on the end opposite said first end, said piston portion with an outer diameter fitting inside the inner diameter of said assembled first cylinder;
a manifold stopper, said manifold stopper further comprised of
 a hole through its center and a gap from the outer surface of said manifold stopper to said hole in said center of said manifold stopper suitable for passing a halyard into said hole;
 a second compressible collar, said second compressible collar suitable to be disposed about a halyard forming a loose fit about a said halyard;
 a male threaded portion, said male threaded portion having a tapered inner wall, said threads of said male threaded portion suitable for mating with said female threads in said manifold portion of said plunger/manifold such that when said manifold stopper male threads are engaged with said female threaded portion of said manifold portion said second compressible collar forms a loose fit about a halyard, and;
a rubber bumper, said rubber bumper having a hole through its center and a gap from the outer surface of said rubber bumper to said hole in said center of said rubber bumper suitable for passing a halyard into said hole such that when said rubber bumper is driven into said plunger/manifold, said piston portion is driven into said lubricant chamber of said first cylinder thereby forcing said lubricant through said bifurcated stem.

8. The apparatus of claim 7 wherein the first compressible collar is sized to clamp a halyard of any of 5/16 inch, 3/8 inch or 7/16 inch.

9. The apparatus of claim 7 wherein the second compressible collar is sized to produce a loose fit about a halyard of any of 5/16 inch, 3/8 inch or 7/16 inch.

10. The apparatus of claim 7 wherein the first compressible collar is sized to clamp a halyard of any of 8 millimeter, 10 millimeter or 12 millimeter.

11. The apparatus of claim 7 wherein the second compressible collar is sized to produce a loose fit about a halyard of any of 8 millimeter, 10 millimeter or 12 millimeter.

12. The apparatus of claim 7 wherein the pair of straps are hook-and-loop straps.

13. The apparatus of claim 7 wherein the pair of straps are hose clamp straps.

14. The apparatus of claim 7 wherein the first cylinder first upper half and first lower half, the plunger/manifold second upper half and second lower half are made of plastic.

15. A method for lubricating the sheaves at the head of a mast of a sailing vessel, comprising:
 assembling a lubricant chamber about a halyard by combining a base stopper, a first top half and a second top half and tightly strapping them together to form said lubricant chamber;
 assembling a plunger/manifold about said halyard by mating a second top half, a second bottom half and a manifold stopper to form said plunger/manifold;
 filling said lubricant chamber with lubricant;
 partially inserting said plunger/manifold into said lubricant chamber;
 placing a rubber bumper about said halyard in such a way as to contact the plunger/manifold;
 hauling the assembled apparatus aloft until said rubber bumper makes contact with the masthead housing, and;
 forcing said plunger/manifold into said lubricant chamber by continuing to haul on said halyard until said lubricant has been dispersed.

\* \* \* \* \*